(12) United States Patent
Kiswani et al.

(10) Patent No.: US 9,104,889 B1
(45) Date of Patent: Aug. 11, 2015

(54) ENCRYPTION ON COMPUTING DEVICE

(71) Applicant: DATA GUARD SOLUTIONS, INC., Oak Forest, IL (US)

(72) Inventors: Rafiq Kiswani, Orland Park, IL (US); Sufyan Almajali, Tinley Park, IL (US)

(*) Notice: Subject to any disclaimer, the term of this patent is extended or adjusted under 35 U.S.C. 154(b) by 0 days.

(21) Appl. No.: 14/271,883

(22) Filed: May 7, 2014

(51) Int. Cl.
*G06F 21/00* (2013.01)
*G06F 21/62* (2013.01)
*H04L 9/08* (2006.01)

(52) U.S. Cl.
CPC .......... *G06F 21/6218* (2013.01); *H04L 9/0861* (2013.01)

(58) Field of Classification Search
CPC ....... G06F 21/60; G06F 21/602; G06F 21/62; G06F 21/64; H04L 9/08
USPC ........................................................ 380/280
See application file for complete search history.

(56) References Cited

U.S. PATENT DOCUMENTS

| 2005/0195975 | A1* | 9/2005 | Kawakita | 380/30 |
| 2006/0177061 | A1* | 8/2006 | Orsini et al. | 380/268 |
| 2006/0282681 | A1* | 12/2006 | Scheidt et al. | 713/186 |
| 2007/0067828 | A1* | 3/2007 | Bychkov | 726/3 |
| 2011/0040971 | A1* | 2/2011 | Lakshminarayanan et al. | 713/168 |

* cited by examiner

*Primary Examiner* — William Goodchild
(74) *Attorney, Agent, or Firm* — Marshall, Gerstein & Borun LLP

(57) ABSTRACT

A first component of a cryptographic key is received from a user via a user interface of a user computing device. A second component of the cryptographic key is received via a short-range communication interface that communicatively couples the user computing device to a physically separate storage device. The cryptographic key is generated based at least on the first component and the second component. The cryptographic key is then used to encrypt and/or decrypt data.

2 Claims, 8 Drawing Sheets

ENCRYPTION ON COMPUTING DEVICE

FIELD OF THE DISCLOSURE

This disclosure relates generally to providing data protection for a computing device and more particularly providing data protection for data contained on the computing device with using encryption of the data to block unauthorized access to the data.

SUMMARY

One embodiment of the techniques of this disclosure is a method for generating cryptographic keys for encrypting and decrypting data, which can be executed by one or more processors. The method includes (i) receiving a first component of a cryptographic key from a user via a user interface of a user computing device, (ii) receiving a second component of the cryptographic key via a short-range communication interface that communicatively couples the user computing device to a physically separate storage device, (iii) generating the cryptographic key based at least on the first component and the second component; and (iv) using the cryptographic key to encrypt and/or decrypt data, by the one or more processors.

Another embodiment of these techniques is a network server including a communication interface to communicatively couple the network server to a user computing device via a communication network and a processing hardware. The processing hardware is configured to receive a request for a cryptographic key from the user computing device, where the request includes a first component of the cryptographic key, the first component having been specified by a user of the user computing device. The processing hardware is further configured to automatically generate a second component of the cryptographic key in response to the request, and provide the second component of the cryptographic key to the user device for storage on a storage device physically separate from the user computing device. The user computing device is configured to (i) generate the cryptographic key based at least on the first component and the second component of the cryptographic key and (ii) encrypt and/or decrypt user-selected data using the cryptographic key.

Yet another embodiment of these techniques is a method in a user computing device for efficiently encrypting and/or decrypting data, which can be executed on or more processors. The method includes (i) receiving an indication that a storage device physically separate from the user computing device is now communicatively coupled to the user computing device via a short-range communication interface, (ii) receiving, by the one or more processors, a first component of a cryptographic key from a user via a user interface, (iii) retrieving, from the storage device, (i) a second component of the cryptographic key, (ii) first control data, and (iii) second control data corresponding to the first control data encrypted using a correct version of the cryptographic key, (iv) generating the cryptographic key based at least on the first component and the second component; and (v) determining whether the generated cryptographic key is correct using the first control data and the second control data.

Still another embodiment of these techniques is a network server including a communication interface to communicatively couple the network to a user computing device via a communication network, a non-transitory computer-readable medium storing instructions that implement a data protection software module, and processing hardware. The data protection software module, when executed on one or more processors of the user computing device, causes the user device to (i) receive a first component of a cryptographic key from a user via a user interface of the user computing device, (ii) receive a second component of the cryptographic key via a short-range communication interface that communicatively couples the user computing device to a physically separate storage device, and (iii) generate a cryptographic key based at least on the first component and the second component, for use in encrypting and/or decrypting user-selected data. The processing hardware configured to provide an instance of the data protection software module to the client device.

DETAILED DESCRIPTION

Figure 1A:
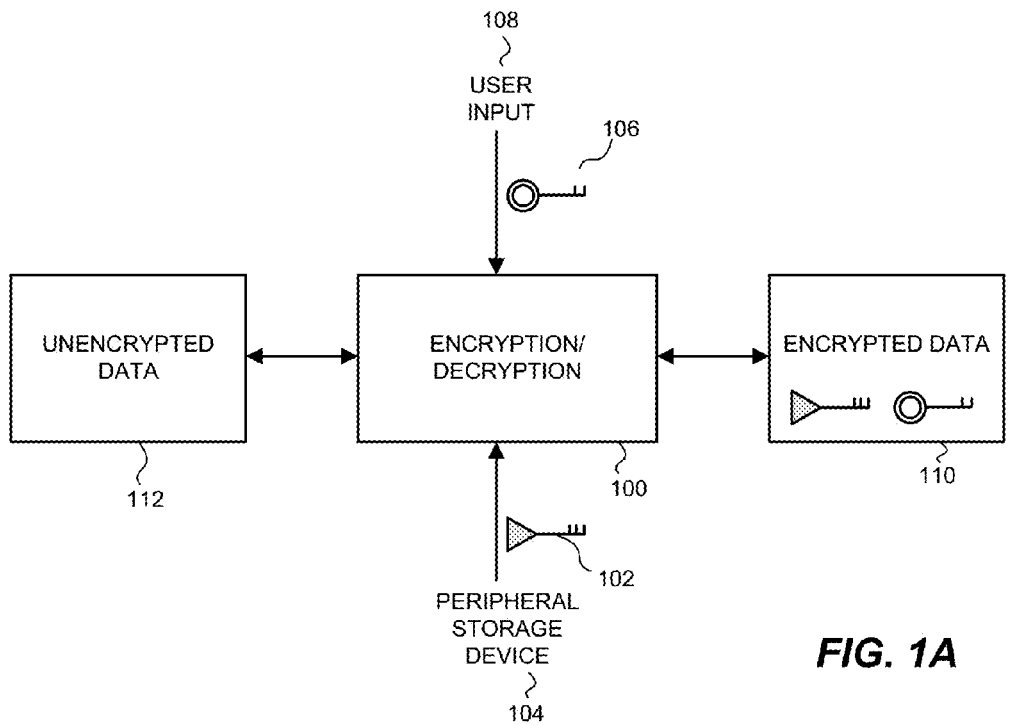
FIG. 1A is a block diagram that schematically illustrates a method for encryption and decryption of data using two keys, where one of the two keys is stored on a removable peripheral storage device.

Through use of computing devices with respect to business or social interaction, people today are being inundated with business, technological and social related data and information. This data, as a result, is often stored on one's computing device(s). Since much of this information may be considered sensitive and/or confidential, no one wants the information accessible to unauthorized persons that may come into possession of their computing device. One approach to protecting this information is to encrypt the information on the computing device with the use of encryption/decryption techniques such as, Advanced Encryption Standard (AES) or the like. The encryption/decryption software will encrypt the sensitive and/or confidential information stored on the computing device and, in turn, permit access to the information by the authorized user using the software to decrypt the information when access to the information is needed.

Data files that will often be encrypted will include, for example, audio, video and text files and the like and will be often stored in an encrypted state on the computing device. As mentioned above, the software employed to encrypt and decrypt these files will include AES, another commonly known encryption/decryption algorithms which utilize a key, or a customized software designed to operate on the devices discussed below. The key is typically a parameter associated with the encryption/decryption software that when employed in association with the encryption/decryption software will transform the data into an encrypted state, one that is not understandable to a viewer. It will also transform that encrypted data back to its original unencrypted state so as to be easily understood by the viewer. In the unfortunate instance of an unauthorized person coming into possession of another's computing device, the unauthorized person is only separated from using the encryption and decryption software successfully to transform the stored data into an understandable state by not having the correct key. The key is typically created or set by the authorized user of the computing device in the form of a password.

These passwords can be compromised in any number of ways which include obtaining the password from the authorized user who has not properly secured the identity of the password. Once in possession of the password or key, in this example, the unauthorized user will have complete access to correctly use the encryption/decryption software stored on the computing device and thereby be able to successfully decrypt encrypted files and access the data of those decrypted files. An object to this disclosure is to provide additional layers of security or depth of security as to preventing an unauthorized user from acquiring the identity of a key. By further securing the identity of the key the unauthorized user will not be able to access the encrypted confidential and/or sensitive data stored on the computing device.

In this disclosure, the key for correctly running the encryption/decryption software must first be fully assembled from component parts which originate from separate sources. One component part of the key will be stored on a peripheral storage device. This one component, as will be discussed in more detail below, will have been previously randomly generated by an online security service and downloaded onto the user's peripheral storage device via the user's computing device at a time in which the user registers with the online security service. The peripheral storage device can be used within a short range of the computing device. With the computing device interfacing with the peripheral storage device, the computing device will automatically read the one component portion of the key stored on the peripheral device. In using the peripheral storage device after the initial registering with an online security service, the one component of the key is transferred to the computing device from the storage device without user interaction. Additionally, this peripheral storage device, at the time of user registration with the online security service, will also download additional data from the online security service in order to authenticate itself, which will be discussed in more detail below.

In this disclosure, another component part of the key will be needed to add to the one component of the key that has already been contributed by the peripheral storage device in order to assemble a complete and operable key. A complete key is needed: otherwise the encryption/decryption software stored on the computing device will not properly encrypt and decrypt data. The other component of the key will be one generated or created by the user also at the time the user registers their computing device with the online security service. For purposes of successfully operating the encryption/decryption software on the computing device, the user will have to input this other component of the key, typically a password, into the computing device through an input device, such as a keyboard or other commonly known input device.

With the user having the peripheral storage device interface with the computing device contributing one component of the key and the user in putting the password, the other component of the key, the key is fully assembled. As mentioned above, the user's computing device will run an authentication or verification routine that will determine if the storage device is the proper one with a correct one component of the key and will also further verify whether the user has input the correct password or other component of the key thereby verifying the correct completion of the assembly of the key. If the key is verified, the user will be able to use the key successfully with the encryption/decryption software on the computing device to encrypt and decrypt data files on the computing device for that session.

Depending on the embodiment, a session during which an assembled key is valid can stay active while the user is logged in, while the peripheral storage device is connected to the computing device, while the computing device is powered on, while a timer is running, or subject to any other suitable condition(s). The session accordingly can end when the users logs out, shuts down the computing device, removes the peripheral storage device, etc.

During an active session, the encryption/decryption software of this disclosure can access the assembled key in a volatile (non-persistent) memory such as RAM. The encryption/decryption software does not store the assembled key in a persistent memory. In general, the assembled key is not stored anywhere in a persistent memory except in a database maintained by the online security service, as discussed in more detail below. When the session is no longer active, the assembled key is purged from the non-persistent memory, so that the encryption/decryption software can no longer encrypt or decrypt data. To start a new session, the user will once again need to provide login/password information defining one of the component parts of the key.

If the user fails to successfully establish a session for failure to supply the proper password (corresponding to one of the component parts of the key), insert the correct peripheral device, etc., the encryption/decryption software cannot properly encrypt data or decrypt previously encrypted files. In one embodiment, the encryption/decryption software does not prevent the user from operating the computing device when a session fails. However, the user in this case cannot decrypt previously encrypted files or encrypt new data. The user still can, for example, use the other functionality of the computing device. Further, if the user chooses to create new files, he or she cannot protect these files using the encryption techniques of this disclosure.

An embodiment of assembling the component parts of the decryption and encryption key from separate sources would include using a Universal Serial Bus (USB) flash drive as the peripheral storage device that will store the one component or portion of the key. The USB flash drive will be inserted into the USB port of the computing device and will automatically interface with the computing device uploading the one component of the key to the computing device. The other component or portion of the key that will be needed to complete a functional key will be a password created by the authorized user also during the registration process with the security online security service. The user will be prompted to enter this other component of the key onto the computing device and the user will enter it through an input device of the computing device such as a keyboard. The software downloaded onto the user's computing device by the online security service at the time of registration will run a verification process of the assembled key now that one component and the other component have been entered onto the computing device. The verification will generally include utilizing a test file and applying the complete key with the encryption/decryption software to decrypt the test file that was previously encrypted and downloaded onto the peripheral device during registration. That encrypted test file was encrypted with the correct complete key and the encryption/decryption software or using the same encryption/decryption technique. The unencrypted version of this test file was also downloaded on the peripheral storage device at the time of registration. The encrypted test file is now subjected to the complete key assembled from one component stored on the peripheral device and the other component input by the user along with the encryption/decryption software that had been downloaded by the online security service onto the computing device during registration. The encrypted file is thusly transformed and compared to see if it matches the unencrypted test file. If there is a match, the peripheral storage device is the correct one carrying one component of the key and the password input by the user was correct completing the assembling of the complete key. This authentication process will be discussed in more detail below. Should the test result be a successful match the user is informed the proper key has been assembled and the user can now proceed to utilize the encryption/decryption software with the completed key to successfully encrypt and decrypt data on their computing device.

Thus, to gain access to the encrypted information on the computing device the user must be in possession of the computing device, the correct peripheral storage device containing one component of the key and the other component or password portion of the key which had been created by the authorized user. Thus, additional security is provided herein with the user having to not only be in possession of the computing device but also, in this embodiment, the proper USB flash drive device carrying the one component of the key and of the password which comprises the other component of the key in order to fully assemble a complete key and be able to successfully operate the encryption/decryption software on that computing device. The user is then capable of successfully carrying out decryption and encryption functions with the encryption/decryption software which had been stored on the computing device during the user's registration process with the online security service.

As will be discussed in more detail herein, a user that wishes to protect the data stored on their computing device will register with an online security service. At that time the user will be asked to provide the online security service information identifying the user, credit card information and the identity of the computing device. During this registration process the online security service will install on the user's computing device the encryption/decryption software for encrypting and decrypting information to be stored on the computing device. As mentioned above, this encryption/decryption software for this embodiment will be AES; however, any other higher level known standard encryption/decryption algorithm may be used. During the installation of this software onto the computing device, the user will be asked to insert a peripheral storage device, or in this embodiment a USB flash drive, into the USB port of the computing device. The online security service will install onto the USB flash drive one component of the key for the encryption/decryption software which the online security service randomly generated. The online security service will also provide the user's computing device with a software module for authenticating the USB drive. Additionally, the user will be asked to create a password, in this embodiment, which will be the other component to assembling a complete key. The password created by the user will allow the online security service to use this password along with the one component of the key it had randomly generated to complete the key. These two components of the key will need to be assembled through actions of the user on occasions when the user needs to successfully encrypt and decrypt data on their computing device. In this embodiment, in the subscription and registering process with the key being completed and the encryption/decryption software installed, the user will be asked whether all of the stored data files shall be encrypted or whether data files will be encrypted as selected by the user. This registration process will be discussed in more detail herein.

Once the user has registered with the online security service by registering themselves, the computing device, downloading the encryption software, uploading their peripheral storage device with one component of the key and authentication software and has created a password that comprises the other component for completing the key, the user has taken the steps they need to protect confidential and/or sensitive data files stored on their computing device. An unauthorized user being in possession of the computing device but not having access to the external peripheral storage device, such as the USB flash drive which carries in this embodiment one component of the key or access to the authorized user's password, the other component to the key, or both, the unauthorized user will not be able to successfully access or view the confidential and/or sensitive stored encrypted data on the computing device.

Figure 3A:
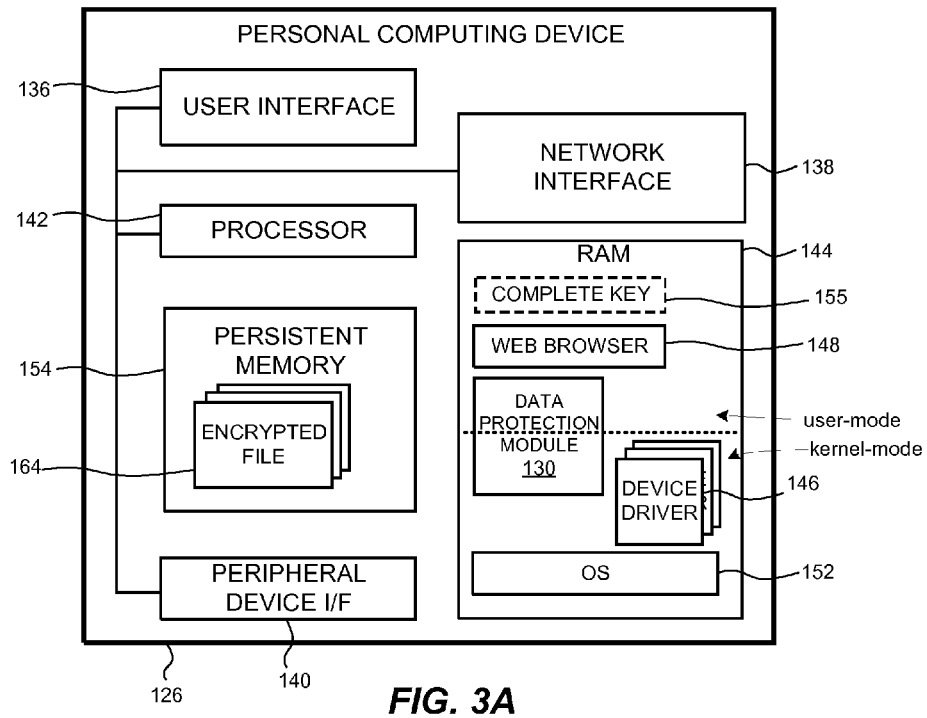
FIG. 3A is a block diagram of an example user device that can operate in the computing system of FIG. 2.

Encryption and decryption appears seamless to the user of the computing device. In particular, the user at some point selects a certain set of files, such as for example the entire hard drive, one or several folders, all text files, etc. The user subsequently accesses these files during active sessions (see above) without being notified or prompted about every encryption or decryption operation. For example, when the user opens or saves of these files saves one of these files, the encryption/decryption software automatically performs the encryption or decryption operation in a seamless manner, without distracting the user. To this end, as illustrated in FIG. 3A, the encryption/decryption software can operate in a kernel model, for example, to reside as a software layer between applications (e.g., text editors, graphics editors, browsers) and operating system calls for accessing hardware components such as the hard disk.

In another embodiment, with the authorized user having assembled the key with inserting the USB flash drive and entering the password, the user can select a particular file and decrypt it. The file can be closed out and the data will remain stored as an encrypted file. New data may be entered into a decrypted file or a new file can be created and with saving either, the file with the new data is encrypted. Thus, using the saving function will encrypt the file.

At the time of registration the online security service will securely store the registration data including the identity of the user and of the computing device, along with the randomly generated one component of the key for that user and the user's other component of the key or password. As a result, the user will be able to subsequently contact the online security service for a number of services related to maintaining the security of their computing device. These services could include assistance in retrieving a password that was forgotten or changing it. The user may have broken, destroyed or lost their peripheral storage device. Under those circumstances, the online security service will also assist the user in replacing the one component of the key or providing a new one component of the key with respect to that which was stored on the peripheral storage device at the time of original subscription and registration. These services will be provided by the online security service with the normal security measures taken to assure the requester is the authorized user of the registered computing device. These measures can include requiring the user to respond to a question to provide very private personal information to the online security service at the time of registration and ask the current requester the same question and match the answer to the original answer provided at the time of registration and if there is a match the online security service will provide the requested services.

In referring to FIG. 1A, a block diagram is shown that schematically illustrates an embodiment of the method of the present disclosure to encrypt and decrypt data stored on a computing device. In order to carry out this method, encryption and decryption software will have been downloaded on the computing device and will be executable by one or more processors on the computing device. The software will operate in conjunction with a complete key associated with that software, on data stored or being stored on the computing device. The step of encryption and decryption of data stored on a computing device is represented by box 100. In this embodiment, the encryption and decryption step 100 will only be able to be successfully carried out to encrypt and decrypt data on the computing device, as mentioned above, with a complete key assembled and working in conjunction with the encryption and decryption software.

One component 102, which is stored on peripheral storage device 104, automatically downloads onto the peripheral storage device 104 interfacing with the computing device. In this embodiment, device 104 is a USB flash drive and it interfaces with computing device by inserting the USB flash drive into the USB port of the computing device. This one component 102 of the key was previously randomly generated and uploaded to the USB flash drive by an online security service during the subscription and registration process with the user. The other component of the key 106 will be input into the computing device by way of user input 108. In this embodiment, the other component 106 of the key will be a password that was created by the user during the registration process between the user and the online security service and is input into the computing device with a keyboard connected to the computing device; however, other inputs can be employed.

The components 102 and 106 can equally contribute to the overall strength of the key or provide different contributions to the overall strength of the key, depending on the embodiment. Thus, in one embodiment, each of the components 102 and 106 occupies the same number of bytes. In another embodiment, component 106 is relatively short (e.g., six characters occupying six bytes) while component 106 is relatively long (e.g., 26 characters occupying 26 bytes).

With the two components of the key 102 and 106 present on the computing device, the complete key has been assembled and is an operable parameter that works in conjunction with the encryption and decryption software. The software can now be executed successfully on the data on the computing device to carry out the step of encryption/decryption 100 of the data the user has selected.

As will later be described in more detail, when the user initially subscribes and registers their computing device with the online security service, the complete key will be assembled at that time and the encryption/decryption software having been uploaded onto the computing device, the user will, in this embodiment, be asked to elect to proceed with the encryption of all files stored on the computing device or to elect to proceed to encrypt those files selected by the user that are stored files on the computing device. In either case, the user will be permitting the encryption/decryption software to operate on stored data in the step of encryption and decryption 100 resulting in the step of creating encrypted data 110.

Subsequent to the initial registration process the user will be able to create encrypted data 110 on their computing device in the presence of a fully assembled key and the encryption/decryption software that is executable by a processor on the computing device, by selecting file(s) that are not encrypted and saving the file(s). This will result in the operation of the software of the encryption/decryption step 100 thereby encrypting that data creating encrypted data 110. Also, the user can save edited versions of unencrypted data they are working on their computing device or save new stand alone data they have created or placed on their computing device, thereby operating the software of the encryption/decryption step 100 which will also result in encrypted data 110.

On the other hand, in the presence of the fully assembled or complete key on the computing device and the encryption and decryption software executable on the computing device, the user can decrypt previously encrypted information or data files stored on the computing device. The user can select a previously encrypted stored data file on the computing device to view, for example, and the step of encryption/decryption 100 will operate on the encrypted data and accordingly transform the data, thereby creating decrypted data 112. In some embodiments, the decryption is seamless, and the user does not notice the file is being decrypted. For example, the user can simply select the file for reading, and the step of encryption/decryption 100 executes automatically.

Figure 1B:
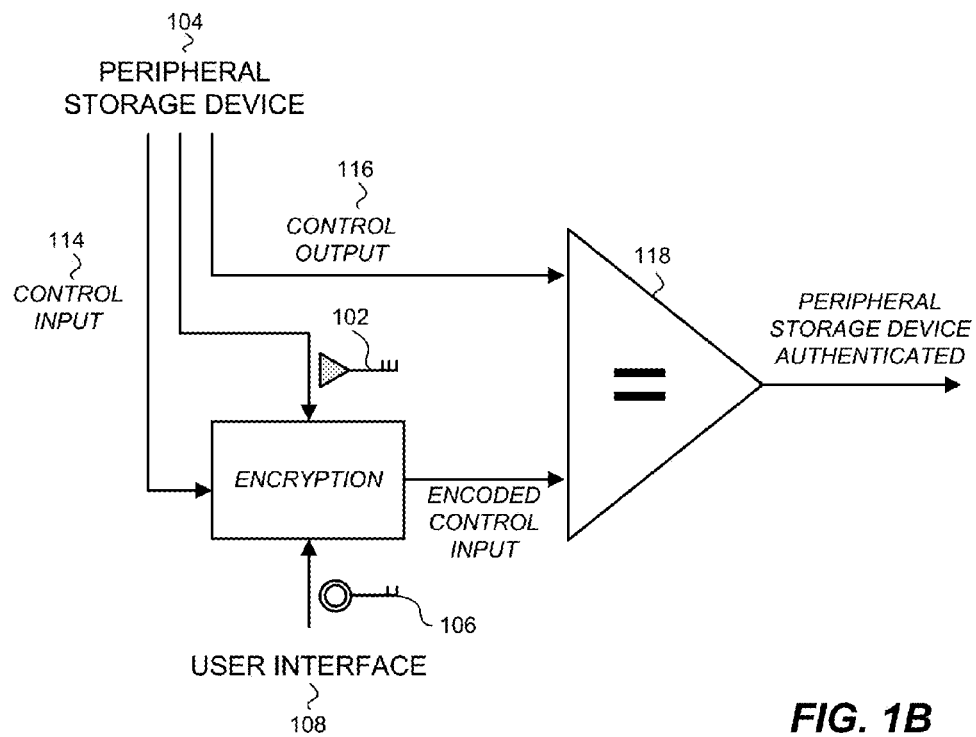
FIG. 1B is a block diagram that schematically illustrates a method for verification of a removable peripheral storage device using control input and control output stored on the removable peripheral storage device.

In referring to FIG. 1B, a block diagram is shown that schematically illustrates a method for verification of the removable peripheral storage device 104. This verification process includes a control input 114, control output 116 and one component 102 being stored on the removable storage device 104 during the registration process with the online security service. In this embodiment, authenticating peripheral storage device 104 is a step taken before any decryption or encryption of data takes place on the computing device. In this embodiment, at a time the user wants to decrypt a particular data file stored on their computing device or wants to encrypt data, the user will need, to connect the peripheral storage device 104 to interface with the computing device. As mentioned earlier, in this example, this will be accomplished by inserting USB flash drive into USB port of the computing device. In one embodiment, this will automatically trigger execution of a peripheral device authentication software on the computing device, which will retrieve one component 102 of the key from peripheral storage device 104 (that was earlier randomly generated by the online security service at the time the user registered and subscribed to the security service).

In this embodiment, the control input file 114 and the control output file 116 that were downloaded onto the peripheral storage device 104 are text files but can be any data that can be encrypted and decrypted with encryption/decryption software such as AES or other encryption and decryption algorithms. During the registration process as will be discussed in more detail below, a complete key was assembled that operates as a parameter in conjunction with the encryption/decryption software the online security service also downloaded onto the computing device during the registration process. Control input file 114 is a text file, in this example, that was encrypted with the complete key and the encryption/decryption software before it was downloaded onto the memory of the peripheral storage device 104 in the registration process. The control output file 116 is the unencrypted version of the control input file 114 which was stored in the memory of the peripheral storage device 104 as well.

With the USB flash drive 104 inserted into the USB port of the computing device, the one component 102 of the key is automatically uploaded onto the computing device. The user will be prompted by the computing device by way of the encryption/decryption software on the computing device to enter the other component 106 of the key by way of user interface 108, or in this example, the computing device keyboard. With both components of key 104 and 106 present, control input file 114 is forwarded from the memory of the peripheral storage device 104 to the computing device and subjected to the encryption/decryption software and the step of encryption/decryption 100 is executed on control input file 114, thereby encrypting control input file 114. The result of this decryption of control input file 114 is forwarded to a comparator 118 of the verification software downloaded by the online security service during the registration process. The decrypted control input file 114 is compared to the control output file 116 which has also been forwarded from the memory of the peripheral storage device 104 and if the comparison of decrypted control input file 114 equates or is the same as control output file 116, the verification of the peripheral storage device 104 has been accomplished. At this point the user can proceed to encrypt and decrypt data on the computing device. If the comparison of the decrypted control input file 114 and control output file 116 results in them not equating or being the same, the user will not be able to exercise successful encryption and decryption operations on the computing device. In either case, the peripheral device authentication software can provide an appropriate notification via the user interface of the computing device.

In another embodiment, comparator 118 can compare two encrypted versions of a same file. In other words, control input file 114 can be unencrypted, and control output file 116 encrypted, versions of a same file. Encryption/decryption step 100 in this case performs to encryption rather than decryption.

Figure 2:
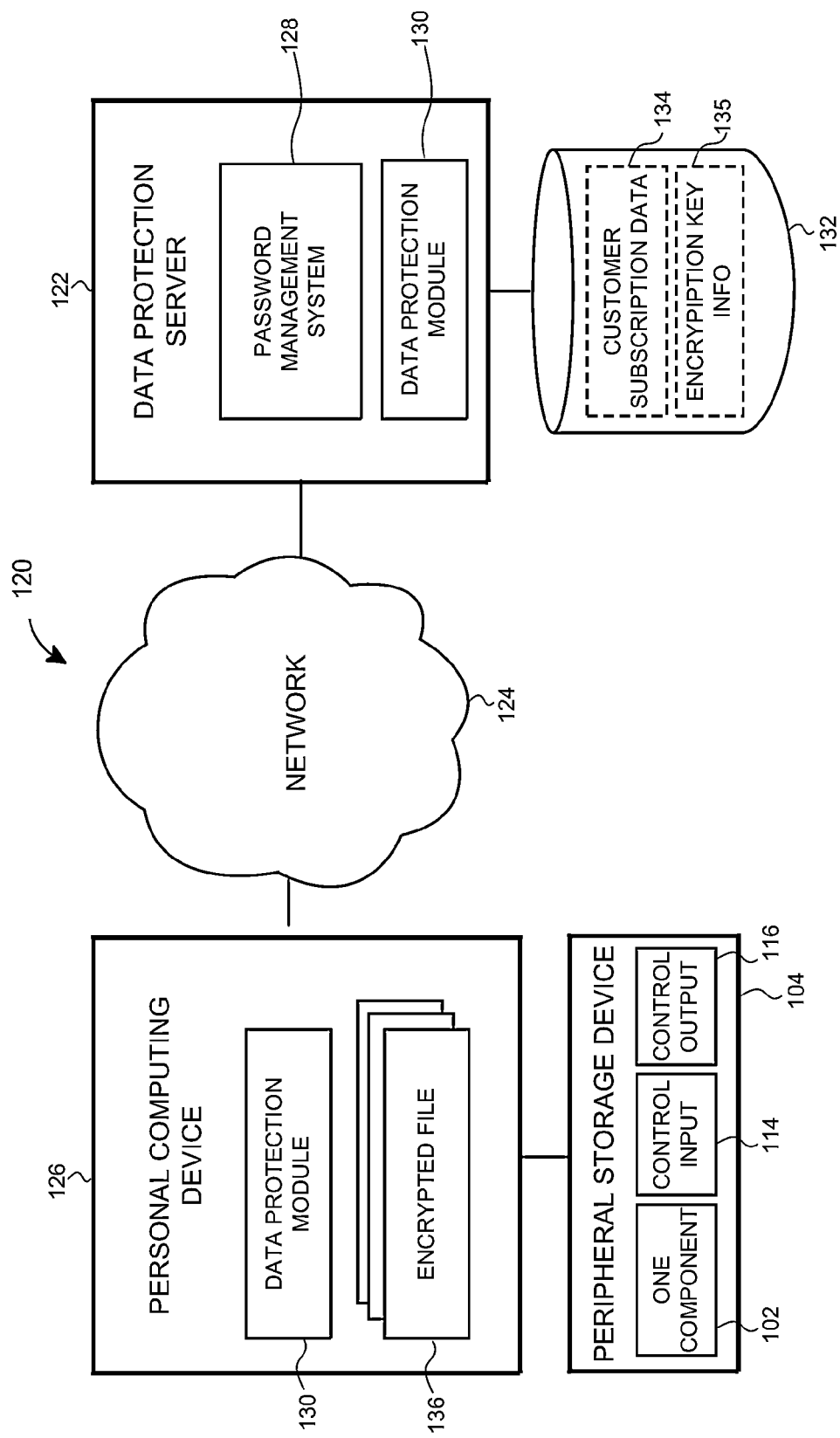
FIG. 2 is a block diagram of an example computing system in which encryption, decryption, and key management techniques of this disclosure can be implemented.

In referring to FIG. 2, it is a block diagram of an example computing system in which encryption, decryption, and key management techniques of this disclosure can be implemented. In the embodiment shown in FIG. 2, a security providing service system 120 operates through data protection server 122 providing the user of a computing device 126 a service as described herein for protecting the data stored on the user's computing device 126 from access by an unauthorized user in possession of the computing device 126.

It will be understood by those skilled in the art that data protection server 122 could include a single server that performs all of the functions described below or could be divided into any number of servers as desired. This server 122 is connected to the network 124 which could be a variety of network types such as the Internet, a LAN, a WAN, cellular, WiFi, etc. The user that wishes to subscribe to the security service for securing data stored on their computing device that is provided by data protection server 122, will access the data protection server 122 through network 124 with their personal computing device 126 also being connected to network 124. Personal computing device 126 could comprise a wide variety of devices, such as a desk top computer, lap top computer, notebook, tablet computer, smart phone, etc. The security service system 120 of the present embodiment will accommodate and be operable with the operating system of computing device 126, which can be Windows®, Mac OS®, Android®, etc.

Server 122 will support a web service that will exchange data with common formats such as XML, JSON and the like. As will be appreciated by those skilled in the art, this embodiment will utilize one of C and C++ language for driver programming. Also, in this embodiment, C# will be combined with C/C++ for use with Windows Platform for example on the personal computing device 126. The web service supported by data protection server 122 can be accessed from computing devices via a web site that includes instructions in HTML or another suitable language. The website supported by data protection server 122 will work on common browsers such as Internet Explorer®, Firefox®, Chrome®, Opera®, Safari® and others.

The user seeking a security service will connect to the website through use of their browser. The website will provide the user an array of security packages to select from, as for example: one user with one computing device to secure; one user with multiple computing devices to secure; or family subscription with multiple devices to secure. The user will select the appropriate plan that will suit for them and proceed with the registration process for that plan.

Data protection server 122 will store and implement software for the security service. This software can be in one or more modules, downloadable onto the personal computing device 126 or another suitable computing device. Some of the modules can be configured to execute on personal computers and other user devices as client components of the authentication system. In this embodiment, there are two modules, password management system 128 and data protection module 130 that will be used to implement some of functionality the security service on user computing devices. Once the user has selected the desired plan or package they wish to subscribe to, password management system module 128 will be used to provide the user web pages to be populated by the user in order to collect information in registering the new user and their computing device to the security service. The information requested will include, in this embodiment, their name, address, e-mail address and banking information such as a credit card information. The user will be asked to execute a payment for the package or plan they had selected. With the payment transaction successfully completed, the password management system 128 will provide the new user queries for creating a user name and password for logging into the security service web site.

With the user name and password completed, password management system module 128, in this embodiment, will assign a user identification (UID) number with the data collected above from the new user. Module 128 will transmit the UID and the data collected above as customer subscription data 134 to database 132, which comprises one or more computing devices with non-transitory memory readable by one or more processors. The database 132 can be, for example, a relational database in which customer subscription data 134 is accessible using SQL queries.

The new user will then be asked by the web page provided by module 128 to identify the computing device(s) 126 to be protected by the security service. In some embodiments, this information in this embodiment will include the make, model and serial number of the computing device(s) 126. This data will likewise be stored in database 132 under the UID number as customer subscription data 134. A customer account has now been created. Module 28 will also manage and interface with the subscriber/new user to provide the new user services related to implementing the security service to the user's computing device(s) 126 and to provide services related to supporting and maintaining the security service for the user.

With the user now registered, the password management system module 128 will randomly generate one component 102 of a key that will be used to assist in assembling a complete key used in conjunction to successfully operate encryption/decryption software with this service. Through password module 128 the website will inform the user encryption/decryption software will be downloaded onto computing device 126 and will cause an instance of data protection module 130 to be downloaded onto computing device 126. With the downloading of the encryption/decryption software commenced, the password module 128 informs user through a web page to connect peripheral storage device 104 to computing device 126, as mentioned previously in this embodiment, to plug in USB flash drive into the USB port of the computing device 126. The password module 128 sends one component key 102 that was randomly generated by password module 128 to computing device 126 wherein the one component 102 is stored on peripheral storage device 104 and at the same time, in this embodiment, password module 128 transmits this one component 102 of the key to data base 132 to be stored as part of encryption key information 135 associated with the UID number of this particular user.

During the downloading process of the encryption/decryption software onto computing device 126, password module 128 will request by way of a web page sent to the new subscriber to create a password. This password will operate as the other component 106 of the key. This password will be transmitted from computing device 126 to data protection server 122 wherein password module 128 will transmit this password or other component 106 of the key to database 132 to be stored as encryption key information 135 in association with this user's UID. At this point, password module 128 will assemble a complete key from one component 102 and other component 106. This complete key which is now associated with this particular user is used by password module 128 in conjunction with the encryption/decryption software of data protection module 130 to encrypt a file that was randomly generated by password module 128. As mentioned above, this file could take many forms of information that can be encrypted and decrypted by the software. In this embodiment it is a text file. The encrypted text file is downloaded to peripheral storage device 104 through computing device 126. This encrypted file is control input file 114. The unencrypted version of this file is transmitted to peripheral storage device 114 from password module 128 through computing device 126 as control output file 116.

During the registration process, with encryption/decryption software downloaded as data protection module 130 and completely assembled key present from one component 102 from peripheral storage device 104 and the other component or password 106 present on computing device 126, the user will provided a query as to whether they want all stored files on computing device 126 or select files stored on computing device 126 encrypted. The user will make a selection and the process will commence to encrypt stored files resulting in encrypted files 136. The user can choose to log off and will have now armed their computing device 126 to be able to more securely protect stored files on computing device 126. At that point, user can then separate their peripheral storage device 114 from computing device 126 and secure device 114. The next time user wishes to use computing device 126 to access stored encrypted data or to receive or create data that it wishes to encrypt, user plugs USB flash drive or peripheral storage device 114 into connection with computing device 126 such as USB port and goes through the peripheral storage device 114 verification process as described earlier. With storage device 114 authenticated, the user can commence decrypting and encrypting files on computing device 126.

Password management module 128 will also allow a user who will access the web site supported by data protection server 122 to request a retrieval of their password 106 from encryption key information 135 stored in database 132. This may occur with the password 106 of the user having been lost, forgotten or compromised. Additionally, password management module 128 will also permit a user to change their password 106 for similar reasons. Each of these steps of retrieval and changing of passwords will be accompanied by security steps to assure the user to be associated with the particular customer account prior to going through either of these processes as discussed above.

Password management module 128 will operate to authenticate the requester. As mentioned earlier, at the time of registration the user will have been asked at least one question so as to provide certain very private information related to the user. This information will be stored by module 128 into data base 132 as customer subscription data 134 in association with the UID. At the time the request is made by the user, the user will be provided the same question asked at the time of registration and the user will provide an answer that will be compared by password management module 128 to the answer provided by user at the time of registration that is stored in customer subscription data 134. If there is a match, password management module 128 will proceed to retrieve or allow the user to change the password. A changed password will be forwarded by module 128 to database 132 and stored in encryption key information 135 in association with the UID of the user in replacement of the former password.

Password management system module 128, as mentioned above, will, at the time of registration, randomly generate one component 102 for the key for the user. This one component 102 is transmitted from module 128 by data protection server 122 to peripheral storage device 104 through computing device 126 and stored on peripheral storage device 104. One component 102 is also transmitted from module 128 to data base 132 as encryption key information 135 in association with the user UID at the time of registration. Thus, for example, if a user loses or breaks their peripheral storage device 104, the user will contact the web page supported by data protection server 122 and module 128 and request either a retrieval or new one component 102. With the matching of very private information as described above with respect to password 106, password module 128 will proceed to retrieve or generate a new, as requested, one component 102. The user will be instructed through a web page to connect their peripheral storage device 104 so that module 128 can transmit one component 102 data through computing device 126 and store it onto peripheral storage device 104. Depending on the circumstances, authentication software from password module 128 along with input control file 114 and output control file 116 can also be downloaded from module 128 through computing device 126 and stored onto peripheral storage device 104. Thus, the online security service can provide services to the user to enable the user to continue to secure their data on their computing device 126.

It is noted that peripheral storage device 104 can be a dedicated storage device (such as a USB flash drive discussed above) or any other device having storage capability that can be communicatively coupled to personal computing device 126. For example, a user can store files 102, 114, and 116 on a smartphone with which personal computing device 126 can set up a USB connection or a wireless connection as a Wireless Personal Area Network (WPAN), for example. As another example, a wearable computer (e.g., a "smart watch") can store the files 102, 114, and 116 and wirelessly connect to personal computing device 126.

Figure 3B:
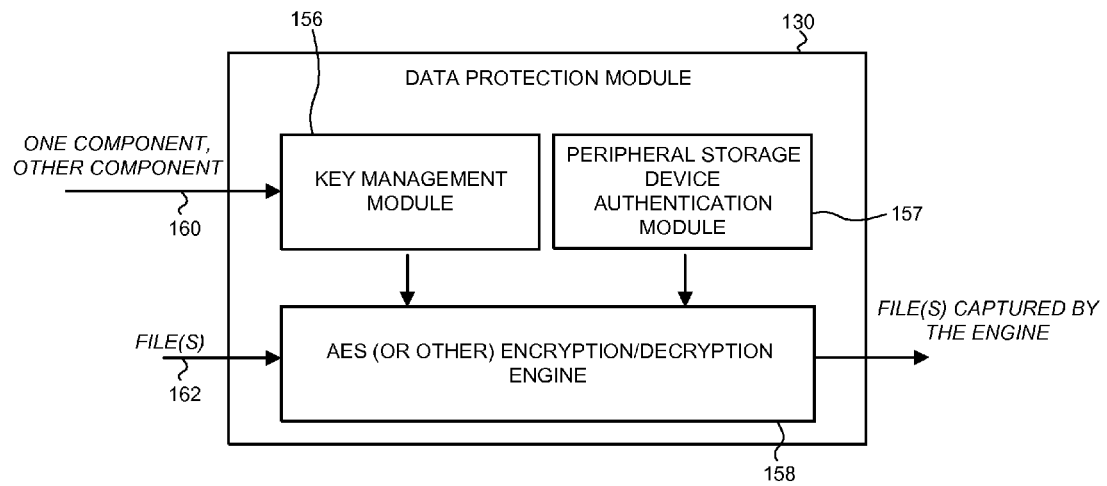
FIG. 3B is a block diagram of an example software module that can be implemented in the user device of FIG. 3A to encrypt and decrypt data using two keys.

Now referring to FIG. 3A, it is a block diagram of an example user computing device 126 that can operate in the computing system of FIG. 2. Personal computing device 126 as mentioned earlier can comprise a desk top computer, lap top computer or notebook or the like. Computing device 126 has a user interface 136 such as a graphical user interface (GUI) which in this embodiment would comprise a screen, a keyboard, a mouse, speakers, etc. A network interface 138 is also provided to permit computing device 126 to interconnect with network 124 in a wired or wireless manner. Computing device 126 further includes a peripheral device interface 140 that will permit other devices such as a USB flash drive or keyboard to be connected to computing device 126 and communicate therewith. One or more processors 142 are provided to execute the software stored on non-persistent memory of the computing device 126 such as on Random-Access Memory or RAM 144 which stores such software programs as device driver software 146, web browser 148, data protection module 130 which in this example carries the encryption/decryption module and operating system software 152 which may include systems such as DOS, OS/2, Windows, Linux, Mac etc. Computing device 126 further includes persistent memory 154, such as a hard disk, flash drive, etc., which will store files and in this embodiment will store encrypted files 164 that have been encrypted by encryption/decryption software within data protection module 130, as shown in FIG. 3B and will also store unencrypted files of user.

As schematically illustrated in FIG. 3A, data protection module 130 can operate similar to a device driver 146 in a kernel mode unlike web browser 148, for example, which runs in user mode. In this manner, the encryption and decryption can be achieved more seamlessly, as various software applications (such as text editing software) can invoke the encryption/decryption functionality of this disclosure similar to the functionality of OS 152.

In an embodiment, RAM 144 also stores a complete key 155 generated based on components 102 and 106. Complete key 155 can be purged from RAM 144 once the user shuts down computing device 126, logs off, or issues an explicit command. In this manner, data protection module 130 can use complete key 155 to encrypt and decrypt files while the current user session is active.

In general, peripheral device interface 140 can support any wired or wireless short-range communication link via which personal computing device 126 can communicate with a peripheral storage device. Some of the examples of a suitable interface include a serial RS232 connection, USB, IEEE 802.15 (Bluetooth®), IEEE 802.11n (WiFi Direct™), etc.

In referring to FIG. 3B, it is a block diagram of an example software module that can be implemented in the user device of FIG. 3A to encrypt and decrypt data using two component keys 102 and 106. Data protection module 130, in this embodiment will include a key management module 156, a peripheral storage device authentication module 157, and encryption/decryption engine 158. Encryption/decryption engine 158 in this embodiment comprises AES; however, it may comprise any comparable or higher level known standard encryption/decryption software may be used. With both components 102, 106 of the key provided in this embodiment one component 102 or Key 1 is the component of the key that was randomly generated by the online security service at the time the user registered with the online security service wherein one component 102 was stored on USB flash drive. One component 102 of the key is stored onto USB flash drive plugged into the USB port of computing device 126 during the registration process. The other component 106 of the key or Key 2 is provided by the user as a password inputted into computing device, such as through use of a keyboard of computing device 126. This password was created at the time of registration with the online security service as well. With both Key 1 and Key 2 102, 106 provided to key management module 156 the complete key is assembled and is provided as an operative parameter to encryption/decryption engine 158. With complete key 155 present with encryption/decryption engine 158, a user can select a file or save a file 162 and the file will be encoded 164. Similarly, with a fully assembled key 155 and the encryption/decryption engine 158 in the presence of an encrypted file 164, encrypted file 164 can be properly decrypted.

Authentication module 157 can receive Key 1 and Key 2, assemble a complete key, verify that the assembled key is correct using the techniques discussed in more detail below, and store the complete key in RAM 144 if the complete key is correct.

Although data protection module 130 in the illustrated embodiments is downloaded from data protection server 122, in general a user can obtain data protection module 130 from any suitable source via any suitable carrier of computer software (e.g., CD, DVD, flash drive). In one example embodiment, the user can download data protection module 130 from a server associated with an online application ("app") store. This server can operate independently and separately from server 122. Data protection module 130 can be platform-specific, so that the online app store can provide one version for a computing device that executes Windows®, another version that executes Mac OS®, etc. In another embodiment, the user installs data protection module 130 from a compact disc (CD).

Further, the security system of this disclosure need not provide all components that make data protection module 130 in all embodiments. Thus, encryption/decryption engine 158 can be provided as a service of an operating system of the computing device. Key management module 156 in these cases can interface with this service using an appropriate application programming interface (API) exposed by the operating system.

In one example embodiment, key management module 156 generates a complete key by simply appending Key 2 to the end of Key 1. Thus, if Key 1 is an user-selected alphanumeric string and Key 2 is a sequence of hexadecimal values, key management module 156 can assemble the complete key by appending the sequence of hexadecimal values defining Key 2 to the sequence of hexadecimal values corresponding to Key 1. More generally, Key 1 and Key 2 can be combined in any suitable manner, such as by interleaving the sequences of values defining Key 1 and Key 2, respectively.

Figure 4A:
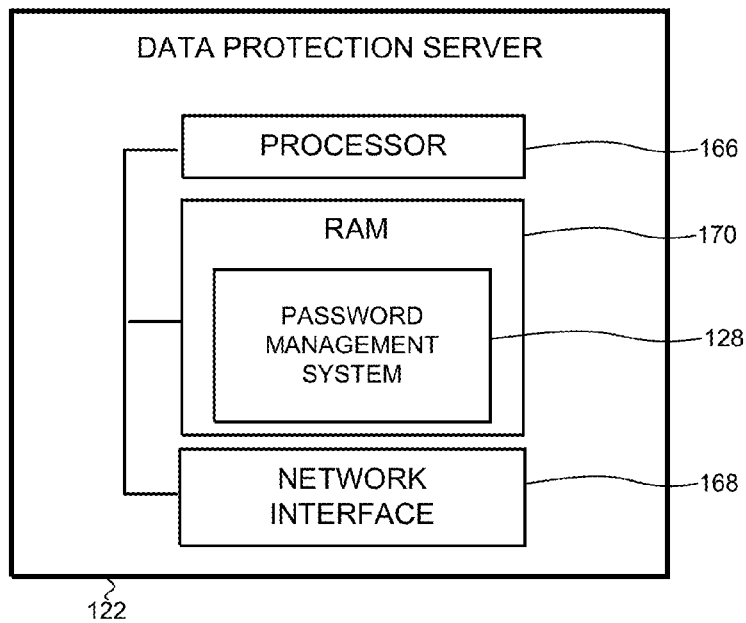
FIG. 4A is a block diagram of an example server that can operate in the computing system of FIG. 2.

In referring to FIG. 4A is a block diagram of an example data protection server 122 that can operate in the computing system of FIG. 2. As mentioned earlier data protection server 122 may comprise one or more servers. Server 122 will comprise one or more processor (s) 166, network interface 168 and RAM 170 much like computing device 126 described earlier. RAM 170 will store, in this example, two software modules password management system 128 and data protection module 130. Processor 166 will be used to execute module 128 and operate network interface 168 permitting server 122 to communicate with network 124.

Figure 4B:
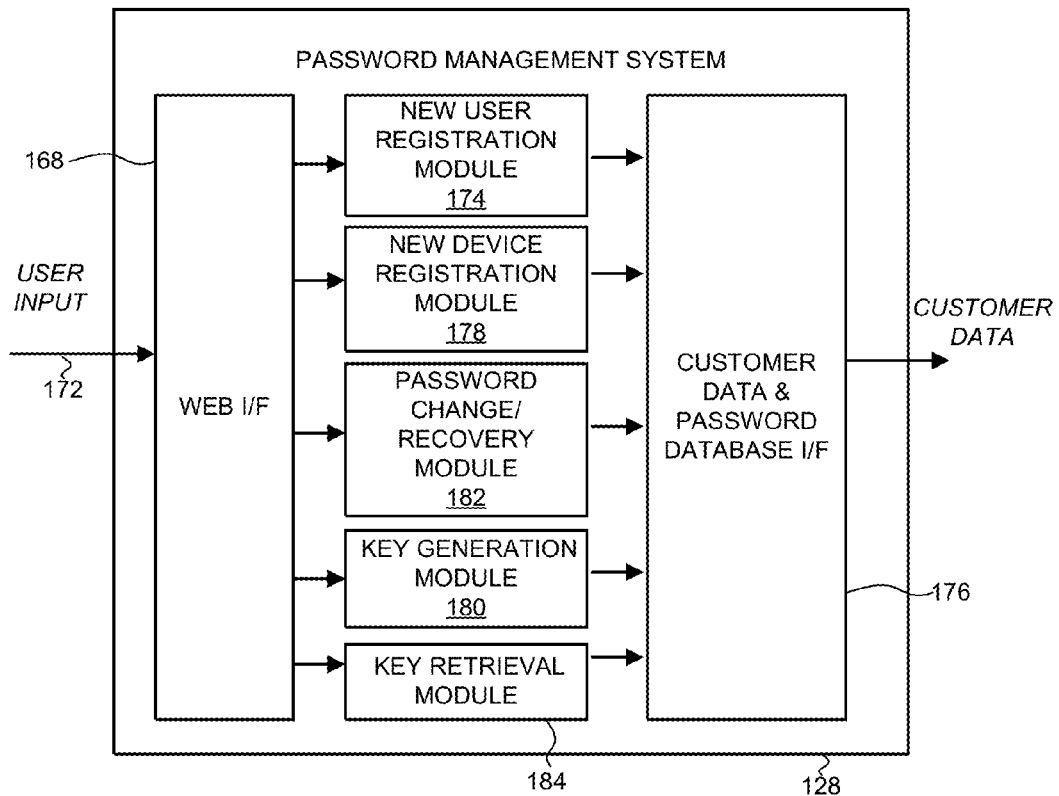
FIG. 4B is a block diagram of an example software system that can be implemented in the server of FIG. 4A to manage keys and provide other functions related to encryption and decryption techniques of this disclosure.

In referring to FIG. 4B is a block diagram of an example software system that can be implemented in the server of FIG. 4A to manage keys and provide other functions related to encryption and decryption techniques of this disclosure. The user of the security service, as described earlier, must first register with the online security service. The user communicates with server 122 using computing device 126 wherein, in this example, both are connected to the internet network 124. As mentioned earlier, user contacts server 122 which along with password management system 128 supports a web page for the security providing system 120. By way of user input 172 and network interface 168 user is in communication with password management system 128.

In the first instance of communicating with the web page provided, the new user registers with online security service by way of new user registration module 174 of password management system 128. The new user will be asked to select from different packages offered by the online security service as discussed earlier. The user will provide input 172 selecting the package the user desires to obtain. The new user will be provided questions to answer from a web page provided such as in this embodiment, the name of the new user, their address, their e-mail address and banking information such as a credit card of the new user. The new user will be asked by new user registration module 174, in this embodiment, to execute a payment to the online security service for the package they had selected. At that point, with a satisfactory payment received by the online security service, module 174 will provide new user queries for creating a user name and a password for entering the system. With user name and password completed, module 174 assigns a user identification (UID) number along with the selection of the package and all information at this point collected from the user and forwards the UID and data collected to customer data & password database interface 176 and it is all then forwarded to database 132 and is stored as customer subscription data 134.

The new user will receive further queries by way of a web page in this embodiment from new device registration module 178. The web page will ask the new user to register the device(s) that are under the package or plan the user chose. In this embodiment the user will be asked to provide some information about the computing device such as the make, model and serial number of computing device 126 that will protected under this security service. This information will be sent to customer database interface 176 and forwarded to database 132 and stored as customer subscription data 134. In this embodiment this data is sent along with the UID and is stored in association with the previous data stored with the same UID. A new customer account has been created.

With the user registered, key generation module 180 of password management system 128 randomly generates one component 102 of the key. This one component 102 is transmitted to the customer data interface 176 and to database 132 and stored under the UID of the new customer as customer subscription data 134. In this embodiment key generation module 180 through a web page will inform the user the encryption/decryption software will be downloaded onto computing device 126 and will commence downloading an instance of the data protection module 130. With the downloading of the encryption/decryption software commenced, system 128 informs user though a web page to connect peripheral storage device 104 to computing device 126. In this example USB flash drive is plugged into USB port of computing device 126. Key generation module 180 sends one component key 102 to computing device 126 wherein the one component 102 is stored on peripheral storage device 104 and at the same time, in this embodiment, key generation module 180 transmits the one component 102 of the key to data base 132 to be stored as encryption key information 135 associated with the UID number of this particular user. In some embodiments, data protection module 130, once downloaded and installed on personal computing device 126, automatically attempts to locate a peripheral storage device, communicates with system 128 to obtain a key, and otherwise set up subsequent encryption and decryption on personal computing device 126.

While the data protection module 130 is being downloaded onto the memory of computing device 126, in this embodiment, password change/recovery module 182 will send a web page to computing device 126 requesting the subscriber to create the other component 106 of the key or a password for the operation of the security system. This password 106 will be transmitted by the computing device 126 of the user to server 122 wherein password module 182 transmits this other component 106 of the key to customer interface 176 and to database 132 and enters it into customer subscription data 134 associated with the UID number of that particular user.

At this point, database 132 has stored both components 102 and 106 of the key. Password module 182 assembles components 102 and 106 of the key and in conjunction with the encryption/decryption software of data protection module 150 encrypts a file it has randomly generated. In this embodiment it is a text file, however, it can be any file that is subject to be being encrypted and decrypted by the encryption/decryption software. Password module 182 transmits the unencrypted file to computing device 126 to be stored on peripheral storage device as control output file 116. Password module 182 also transmits to computing device 126 the corresponding encrypted file to computing device 126 to be stored as control input file 114.

Password management system 128 also will allow a user to enter the web site of the online security service that is supported by server 122 and through a web page provided by password change/recovery module 182 request a recovery or retrieval of their password or other component 106 of the key that is stored in customer subscription data 134. This may occur upon the user forgetting the password 106 or password 106 has been compromised. As discussed earlier, once the user has logged into the web site of the online security service and has requested such a retrieval, the web page will exercise a security step prior to carrying out the request. The web page will ask at least one question that user had provided the answer to at the time of registration. This information is typically very private in nature as it relates to the user. With a match answer received by module 182, password change/recovery module 182 will proceed to retrieve the password 106 stored in customer subscription data 134 and transmit the same to computing device 126 to the user.

This same security procedure will be used for the user to be able to change their password or other component 106 of the key. The procedure for changing the password will require, in this embodiment, the user to forward from computing device 126 two copies of the new password 106 for accuracy verification. The new password 106 will be stored as customer subscription data 134 in database 132. In addition, this new other component or password 106 will now have to be used to construct a new key. The user will be asked to connect their peripheral storage device 104, password change/recovery module 182 will take the new password 106 and combine it with the one component 102 of the key to assemble a new complete key. This new key will be used to encrypt another file, in this instance a text file and forward it to computing device 126 for it to be stored on peripheral storage device 104 as control input file 114 and an unencrypted version of that file will be sent to computing device 126 to be stored as control output file 116. As a note, the old complete key could be assembled by module 182 and provide user with the corresponding control input file 114 and control output file 116 in order for user to access their stored encrypted files and decrypt them. At that point, the user can utilize the new complete key with the new control input file 114 and control output file 116 and begin encrypting and decrypting files with the new complete key.

To make this procedure appear seamless for the user, password management system 128 automatically re-encrypts, using the new key, those files that were encrypted using the old key. It is noted, however, that this procedure may consume a noticeable amount of time.

As mentioned above, key generation module 180 would randomly generate one component 102 of the key for the user at the time of registration. This one component 102 was stored as customer subscription data 134 in database 132 and was stored on the user's peripheral storage device 104 as well. Thus, at a time, for example, the user loses their peripheral storage device 104 or it is broken or stolen the user will not be able to encrypt or decrypt data on their computing device 126 without this one component 102 of the key that was stored on the peripheral storage device 104. As a result the user will contact the online security service's web page, log in and request a retrieval of the one component 102 of the key. The user will be security cleared as mentioned above with respect to retrieval or change of the other component 106 of the key or password. Key retrieval module 184 will retrieve one component 102 of the key from customer subscription data 134 on database 132. The user will be asked to connect their peripheral storage device 104 to their computing device 126 and module 184 will transmit one component 102 of the key to computing device 126 to be stored on peripheral storage device 104. If at that time, it was a new peripheral storage device, user would be asked for receiving control input file 114 that was encrypted by module 184 and for the corresponding unencrypted file control output file 116. Should the user need files 114 and 116 they would also be forwarded by module 184 to computing device 126 to be stored on peripheral storage device 104. The user would be provided the needed authentication software to authenticate the peripheral storage device 104 as would be transmitted to the computing device 126 by module 184 and stored on peripheral storage device 104. With respect to creating a new one component 102, a new key would need to be assembled and creating new control input 114 and control output 116 files would need to be generated and stored on peripheral storage device 104. Also, the user may need to have the previous one component 102 of the key and the corresponding control input 114 and control output 116 files created in order for the user to operate to decrypt encrypted files under the earlier regimen of a different complete key with its corresponding different authentication set up.

As a result, the online security service can provide various needed services through a web page supported by server 122. The user can access the web page with its computing device 126 through the internet network 124. In this way the user may change passwords 106, retrieve passwords 106, retrieve one component 102 of the key, obtain control input file 114, control output file 116 and the needed software to carry out authentication of the peripheral storage device 104.

Figure 5:
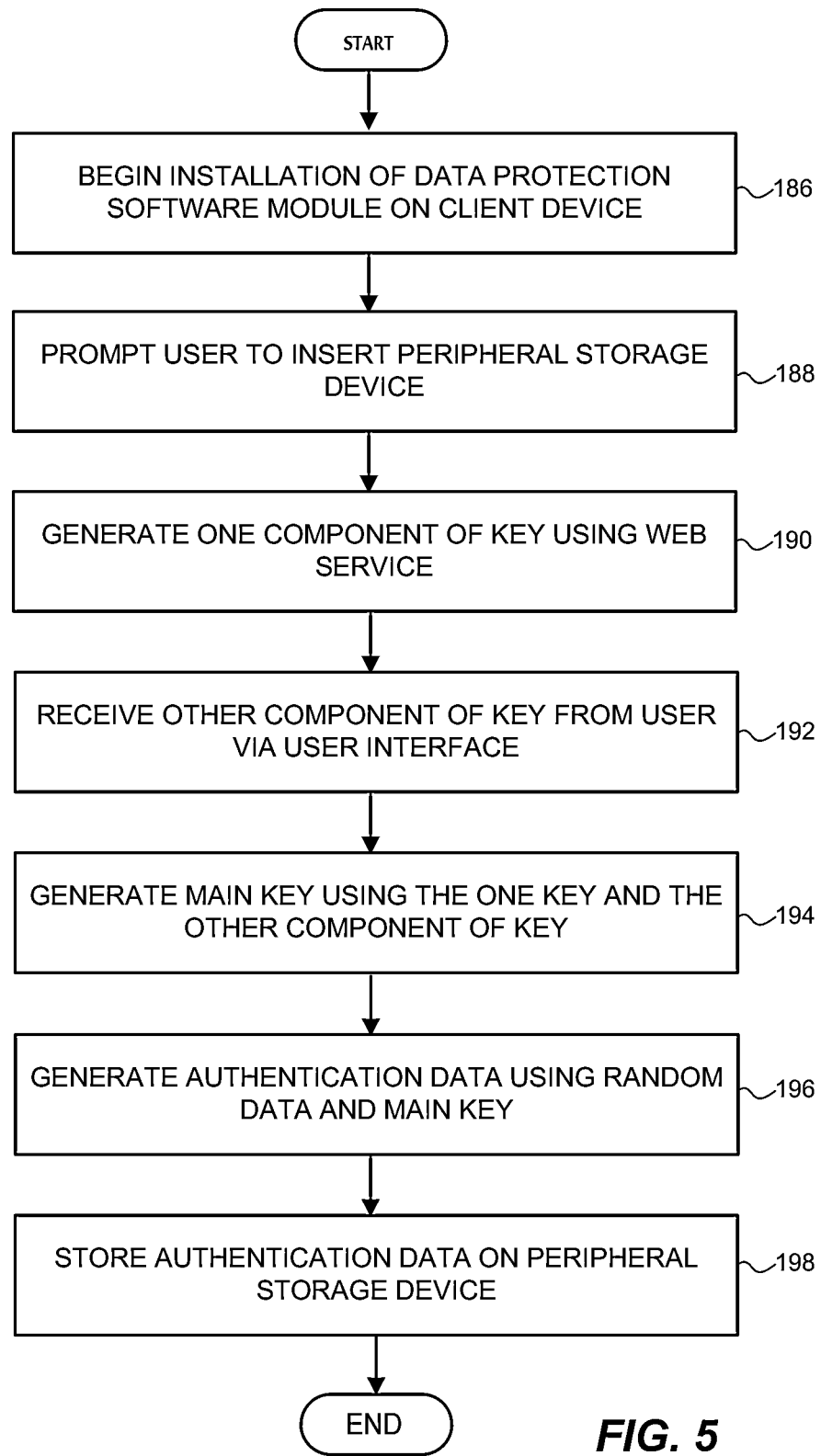
FIG. 5 is a flow diagram of an example method for creating a pair of keys and generating authentication information for a removable storage device, which can be implemented in the user device of FIG. 3A.

In referring to FIG. 5, it is a flow diagram of an example method for creating a pair of keys and generating authentication information for a removable storage device 104, which can be implemented in the user computing device 126 of FIG. 3A. With computing device 126 connected to data protection server 122 through internet network 124 connection, in this embodiment, and the account opened by the user as described above, step 186 commences with data protection module 130 being downloaded and/or installed onto computing device 126. Data protection module 130 can include key management module 156 and/or encryption/decryption engine 158. In step 188, the web site of the online security service which is supported by server 122 will prompt user to insert peripheral storage device 104 into their computing device 126. Key generation module 180 will randomly generate one component 102 of the key or first key in step 190. The web site of the online security service will notify user to create a second key or other component 106 (step 192) and forward the same from computing device 126 to be received by server 122 through network interface 168. In this embodiment, password management system 128 through password change/recovery module 182 will assemble a complete or main key from one component 102 and other component 106 of the key in step 194. Password management system 128 will generate authentication data with using the complete or main key in conjunction with encryption/decryption software of data protection module 130 and encrypts a file it randomly generated. This file is an encryptable and decryptable file with respect to the encryption/decryption software. In this embodiment the file is a text file and it is encrypted, while maintaining an unencrypted version of the file as well for step 196. The encrypted version of the file is forwarded to computing device 126 and stored on the peripheral storage device 104 as control input file 114 and the unencrypted version of that file is forwarded to computing device 126 and stored on peripheral device 104 as control output file 116 in step 198.

Figure 6:
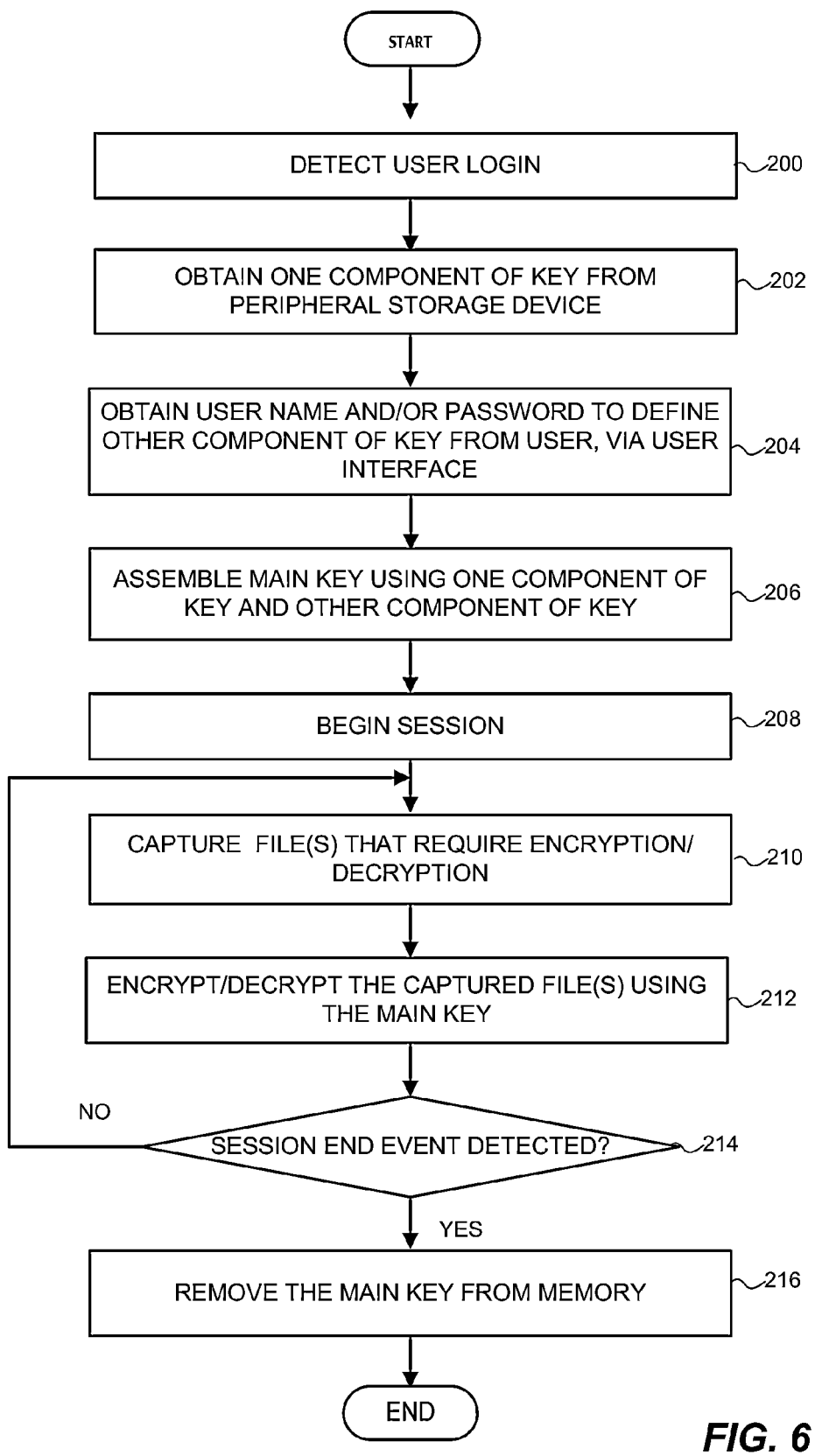
FIG. 6 is a flow diagram of an example method for encrypting data using one component of a key stored on a removable storage device and another component of a key submitted by a user, which can be implemented in the user computing device of FIG. 3A.

In referring to FIG. 6, it is a flow diagram of an example method for encrypting data using one component 102 of a key stored on a removable storage device 104 and another component 106 of the key submitted by a user which can be implemented in the user computing device 126 of FIG. 3A. In the illustrated embodiment, user login can be detected at block 200. This event can trigger the creation of a new session during which data is seamlessly encrypted and/or decrypted. More generally, a session can begin in response to any one of suitable events such as connection to a peripheral storage device or a user command, for example.

The encryption/decryption software can commence the process of assembling the encryption key by obtaining one component 102 of a key for encrypting from a peripheral storage device 104 as step 202. In this embodiment one component 102 of the key was stored on the peripheral storage device 104 by the online security service randomly generating it at the time of registration. The user then needs to provide another component 106 of the key (which the user had created at the time of registration by the user) to the encryption/decryption software in putting it into computing device 126 through a user interface such as a keyboard as step 204. The next step 206 is for the key to be assembled on computing device 126 with using one component 102 and another component 106.

With the complete key assembled and encryption/decryption software stored on the computing device 126, at the time of registration, an encryption/decryption session begins in step 208. In particular, the assembled key may be stored in volatile memory for the duration of the session. During the session, one or several files that require encryption or decryption are captured in step 210. These files are encrypted or decrypted in step 212 using the key assembled for the session. If an event indicating that the session completed is detected in step 214, the flow returns to block 210 (where additional file(s) may be captured). Otherwise, the flow proceeds to step 216, where the key is removed from the volatile memory.

Figure 7:
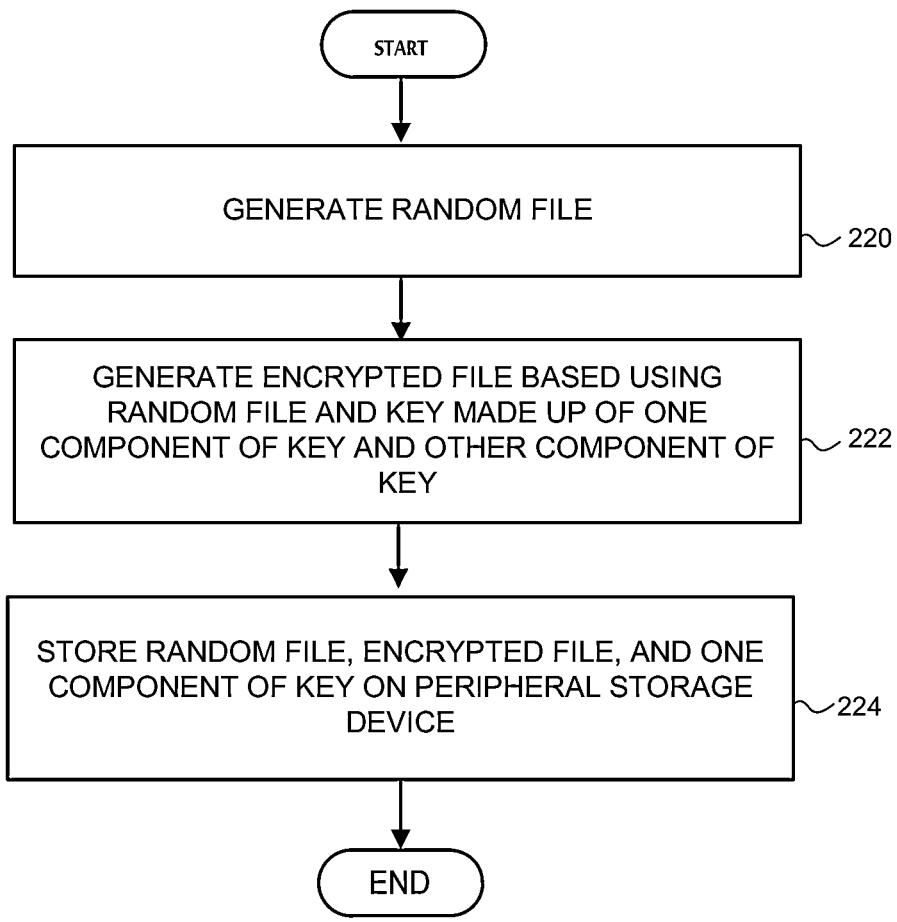
FIG. 7 is a flow diagram of an example method for generating authentication information for a removable storage device, which can be implemented in the server of FIG. 4A.

FIG. 7 shows a flow diagram of an example method for generating authentication information for a removable storage device 104, which can be implemented to authenticate peripheral storage device 104 of FIG. 2. Password management system 128, stored on server 122 will generate a random file, one that can be encrypted and decrypted by the encryption/decryption engine 158 of data protection module 130 used in conjunction with one component 102 and another component 106 of the key assembled into a complete key. In this embodiment, password management system 128 will generate this random file as a text file in step 220. With the fully assembled key comprised of one component 102 and another component 106, both retrieved from customer subscription data 134 from database 132, module 182 with the complete key and encryption/decryption software from data protection module 130 will encrypt the text file in step 222. The encrypted text file is transmitted to computing device 126 and stored in peripheral storage device 104 as control input file 114, the corresponding unencrypted randomly generated file is transmitted to computing device 126 and stored on peripheral storage device 104 as control output 116 and one component 102 of the key is also transmitted to computing device 126 and stored on peripheral storage device 104 as step 224. This data stored on peripheral storage device 104 will be used as discussed earlier to carry out the authentication function of the peripheral storage device 104.

Figure 8:
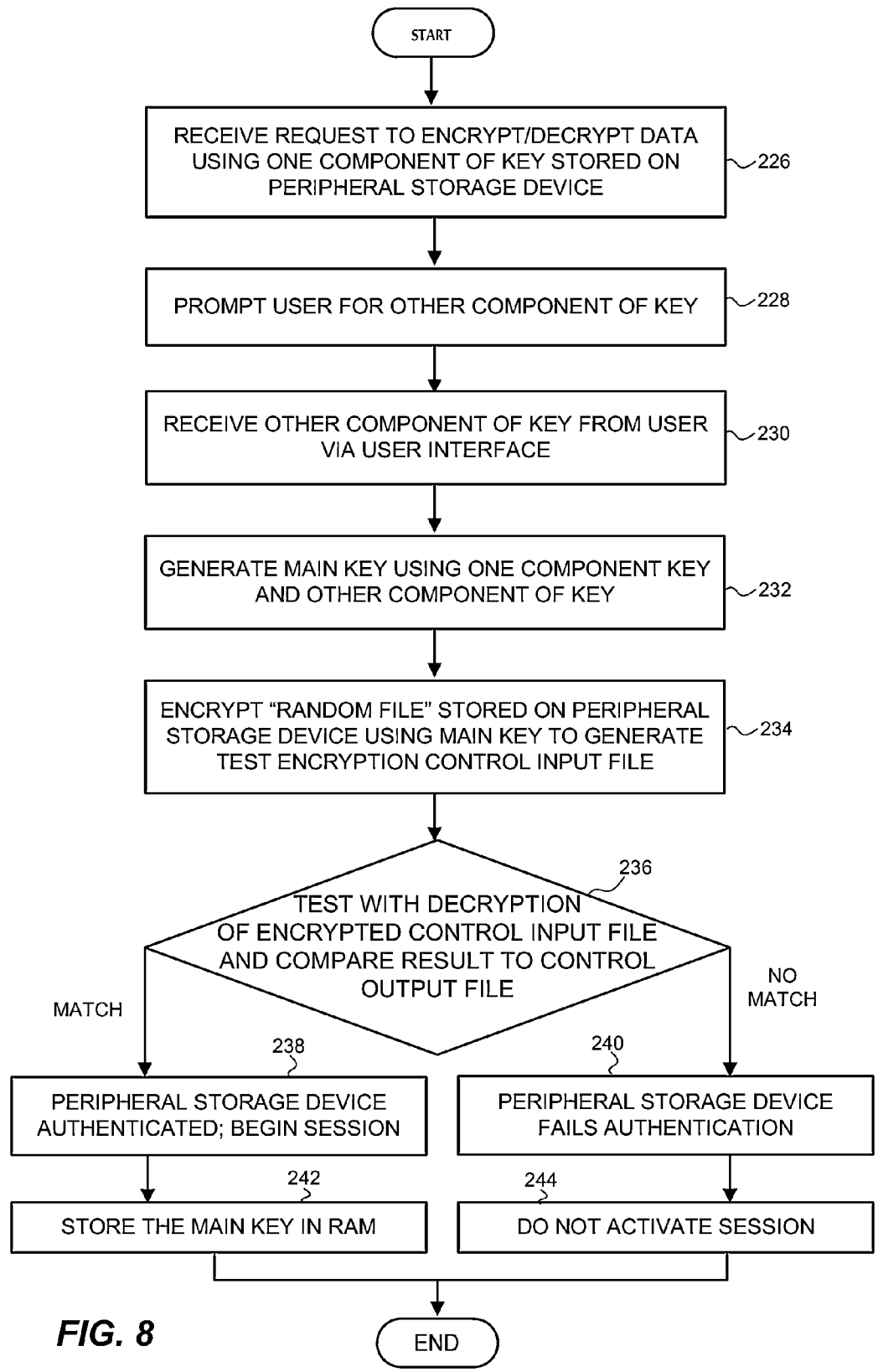
FIG. 8 is a flow diagram of an example method for authenticating a removable storage device storing a key.

In referring to FIG. 8, it is a flow diagram of an example method for authenticating a removable storage device 104 storing a key. The method in this embodiment includes a user in operation of their computing device 126 wishing to either encrypt/decrypt data on their computing device 126. User will request the encryption/decryption of the data which will use one component 102 of the key which is stored on peripheral storage device 104 as step 226. The user will be prompted to provide the other component 106 of the key in step 228 which as discussed earlier would be a password in this embodiment. At which point, user can enter other component 106 by way of user interface or keyboard of computing device 126, in step 230 in this example. With one component 102 and other component 106 of the key, the main or complete key is assembled in step 232.

With the main key assembled and the encryption/decryption engine 158 present from data protection module 130, a randomly generated file by password change module 182 as discussed above, in this embodiment, the randomly generated file is generated by module 182 and encrypted. The encrypted version is stored on the peripheral storage device 104 as control input 114 as step 234, the corresponding unencrypted version of the file is stored on the peripheral storage device 104 as control output 116 and the one component 102 of the key is also stored on peripheral storage device 104.

With the encrypted version of the file or control input file 114 in step 236 is decrypted by the complete or main key comprising components 102 and 106 in conjunction with encryption/decryption engine 158 and the now decrypted input control file 114 is compared to corresponding unencrypted file 116 in step 236. If there is a match, "yes", peripheral storage device 104 is authenticated at step 238. This means the main key was properly assembled and used with the encryption/decryption engine 158 and user can proceed to encrypt and decrypt files on their computing device 126. The main key is stored in RAM (or other type of volatile memory) in step 242 for the duration of the session. However, if there was not a match between the decrypted control input file 114 and the control output file 116, "no", the peripheral storage device fails to authenticate in step 240 meaning one or both of the components 102 and 106 of the key were wrong thereby indicating the storage device 104 is not the correct device carrying the correct one component 102 of the key or the other component 106 of the key was not correct. In either instance, the user will not be able to successfully proceed to encrypt and decrypt files on the computing device 126. Accordingly, in step 244, the session is prevented from being activated, so that previously encrypted files cannot be decrypted and, conversely, new files cannot be encrypted using the techniques of this disclosure.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components or modules. Modules may constitute either software modules (e.g., code stored on a non-transitory machine-readable medium) or hardware modules. A hardware module is tangible unit capable of performing certain operations and may be configured or arranged in a certain manner. A hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module in dedicated and permanently configured circuitry or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The performance of certain operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

While particular embodiments of the present invention have been shown and described, it will be obvious to those skilled in the relevant arts that changes and modifications may be made without departing from the invention in its broader aspects. Therefore, the aim in the appended claims is to cover all such changes and modifications that fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

What is claimed is:

1. A network server comprising:
   a communication interface to communicatively couple the network to a user computing device via a communication network;
   a non-transitory computer-readable medium storing thereon a plurality of instructions that implement a data protection software module which, when executed on one or more processors of the user computing device, causes the user device to:
      receive a first component of a cryptographic key from a user via a user interface of the user computing device,
      receive a second component of the cryptographic key via a short-range communication interface that communicatively couples the user computing device to a physically separate storage device, and
      generate a cryptographic key based at least on the first component and the second component, for use in encrypting and/or decrypting user-selected data;
   the network server further comprising:
      processing hardware configured:
         to provide an instance of the data protection software module to the user computing device,
         generate the second component of the cryptographic key,
         provide the second component of the cryptographic key to the user computing device for storage on the storage device receive the first component of the cryptographic key from the user computing device,
         generate the cryptographic key using the first component and the second component of the cryptographic key, and
         generate key verification data using the cryptographic key for storage on the storage device, including (i) randomly generate first control data, (ii) encrypt the first control data using the cryptographic key to generate second control data, and (iii) provide the first control data and the second control data to the user computing device along with the second component of the cryptographic key.

2. The network server of claim 1, wherein to generate the cryptographic key, the processing hardware is configured to append one of the first and the second component of the cryptographic key to the other one of the first and the second component of the cryptographic key.

\* \* \* \* \*